United States Patent [19]

Yamashita et al.

[11] 4,134,837

[45] Jan. 16, 1979

[54] ETHYLENE-VINYL ALCOHOL COPOLYMER MEMBRANES HAVING IMPROVED PERMEABILITY CHARACTERISTICS AND A METHOD FOR PRODUCING THE SAME

[75] Inventors: Shuzo Yamashita; Shiro Nagata, both of Kurashiki; Koichi Takakura, Okayama, all of Japan

[73] Assignee: Kuraray Co., Ltd., Kurashiki, Japan

[21] Appl. No.: 694,669

[22] Filed: Jun. 10, 1976

[30] Foreign Application Priority Data

Jun. 10, 1975 [JP] Japan .................................. 50-69873

[51] Int. Cl.$^2$ ............................................ B29D 27/04
[52] U.S. Cl. ................................. 210/500 M; 264/41; 264/216; 264/DIG. 62
[58] Field of Search .................. 264/41, 216, DIG. 62; 210/500 M

[56] References Cited

U.S. PATENT DOCUMENTS

| | | | |
|---|---|---|---|
| 3,772,072 | 11/1973 | Brown et al. | 264/41 X |
| 3,780,147 | 12/1973 | Stana | 264/41 X |
| 3,878,276 | 4/1975 | Hoernschemeyer | 264/41 |
| 3,884,801 | 5/1975 | Kesting | 264/41 X |
| 3,907,675 | 9/1975 | Chapurlat et al. | 264/41 X |
| 3,917,777 | 11/1975 | Asada et al. | 264/41 |
| 3,957,935 | 5/1976 | Staude | 264/41 |
| 3,962,158 | 6/1976 | Mima et al. | 210/500 MX |

OTHER PUBLICATIONS

Vos, Kenneth D. and F. O. Burris, "Drying Cellulose Acetate Reverse Osmosis Membranes" in I & EC Product Research and Development, vol. 8, No. 1, March 1969, pp. 84–89.

Bruck, Stephen D. "Aspects of Three Types of Hydrogels for Biomedical Applications," in J. Biomed. Mater. Res. vol. 7, No. 5, Sep. 1973, pp. 387–391.

Lakshminarayanaiah, N. "Transport Phenomena in Membranes," New York, Academic Press, 1969, pp. 318–325.

Chiu, Yishu "A Dictionary for Unit Conversion", Washington, D.C., School of Engineering and Applied Science, The George Washington University, ©1975, pp. 109 and 325.

Brydson, J. A. "Flow Properties of Polymer Melts", London, Iliffe Books, ©1970, pp. 6 and 7.

*Primary Examiner*—Philip Anderson
*Attorney, Agent, or Firm*—Oblon, Fisher, Spivak, McClelland & Maier

[57] ABSTRACT

Ethylene-vinyl alcohol copolymer membranes characterized by constituent particles having an average diameter within the range of from 100 to 10,000 Angstrom units, determined under an electron microscope for the dry membrane, bonded to each other, wherein the membrane is substantially free from pores in excess of from 2 microns in diameter.

Such a membrane has a permeability to water of 10 to $200 \times 10^{-16}$ cm$^2$ and to vitamin B$_{12}$ of not less than $0.8 \times 10^{-7}$ cm$^2$ per second, and being of particular value as a membrane for the dialysis of blood.

The membrane is obtained by dissolving an ethylenevinyl alcohol copolymer in a solvent consisting essentially of dimethylsulfoxide or dimethylacetamide and causing the resulting solution to coagulate from an aqueous coagulation bath under mild conditions such that the coagulation time as defined in the specification is not less than 3 seconds.

14 Claims, 9 Drawing Figures

ETHYLENE-VINYL ALCOHOL COPOLYMER MEMBRANES HAVING IMPROVED PERMEABILITY CHARACTERISTICS AND A METHOD FOR PRODUCING THE SAME

Field of the Invention

The present invention relates to ethylene-vinyl alcohol copolymer membranes which are useful as selective separation membranes and, particularly, of value as membranes for blood dialysis in artificial kidneys.

DESCRIPTION OF THE PRIOR ART

Heretofore cuprammonium cellulose membranes have been widely employed in the dialysis of blood, but because of their inadequate permeability performance, improved dialysis membranes are desired. The requirements of a membrane for artificial kidney applications include the following. Such a membrane should have a controlled permeability to water, a very high permeability to substances of the so-called intermediate molecular weight, i.e. in the neighborhood of 300 to 6000, a comparatively low molecular weight dependence, and a high rejection for proteins and other biologically essential substances. To develop a membrane having such desired properties, membrane characteristics of various high polymer materials have been investigated.

In this connection, we have found that ethylene-vinyl alcohol copolymers have excellent biological compatibility, satisfactory antihaemolytic and antithromogenic properties and such other properties as durability, chemical stability, heat-sealability, etc., thus making themselves suitable membrane materials for the dialysis of blood.

So far, Hirofuji et al (Japanese Patent Application Laid Open No. 113859/1974) succeeded in the production of a permeable film from an ethylene-vinyl alcohol copolymer. However, because they dissolved the ethylene-vinyl alcohol copolymer in a solvent mixture of water and alcohol (e.g. water-methanol, water-isopropyl alcohol, etc.) and wetcast the solution, the resultant film displayed white turbidity and lacked of uniform structure, there being a thick skin or superficial layer and a multiplicity of pores as large as upwards of 2 microns in the inner layer. It followed, then, that, while the film could have a high permeability to water, it was not sufficiently permeable to substances of intermediate molecular weight (e.g. vitamin $B_{12}$). Such characteristics, of course, do not make the film suitable for use as a membrane for blood dialysis applications and even when it is to be employed for other separation functions, the range of use is limited considerably. This is why, to this day, ethylene-vinyl alcohol copolymers have found only limited application.

It was, thus, obvious that should the aforementioned lack of homogeneity of the ethylene-vinyl alcohol copolymer membranes and the presence of large pores therein be overcome and eliminated, one would be able to obtain an excellent membrane for the dialysis of blood by virtue of the inherent biological compatibility and structural and chemical characteristics of this category of copolymer materials. So long as one depends upon the production methods heretofore attempted, however, it is impossible to obtain a membrane having properly controlled permeability to water, high permeability to substances of intermediate molecular weight and a high rejection for proteins and other essential blood constituents.

SUMMARY OF THE INVENTION

It is therefore an object of the present invention to provide an ethylene-vinyl alcohol copolymer membrane which is of value as a selective separation membrane and a method for producing said membrane.

It is another object of the present invention to provide an ethylene-vinyl alcohol copolymer membrane which is of value as a membrane for the dialysis of blood and a method for producing such membrane.

Still another object is to provide an ethylene-vinyl alcohol copolymer membrane which is free from pores in excess of 2 microns, which abound in conventional membranes, and which has smaller and substantially uniform micropores, and a method for producing such membrane.

The above objects are accomplished by providing an ethylene-vinyl alcohol copolymer membrane such that, as observed in the dry condition with an electron microscope, it consists of particles, the average diameter of which is substantially within the range of 100 to 10,000 Angstrom units and which are bonded to each other wherein the membrane is substantially free from pores in excess of 2 microns in diameter.

DETAILED DESCRIPTION OF THE PREFERRED EMBODIMENTS

Figure 1:
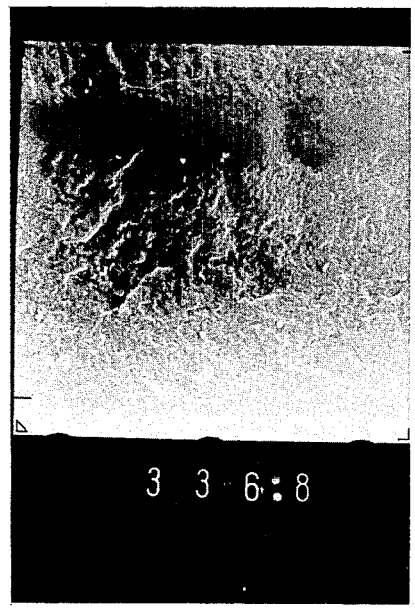
FIGS. 1 to 5 are electronmicrographs showing the cross-sectional views of ethylene-vinyl alcohol copolymer membranes according to the present invention.

The ethylene-vinyl alcohol copolymers employable according to the present invention may be random, block or graft copolymers. It should, however, is understood that if the ethylene content of such as copolymer be less than 10 mole percent, the resultant membrane will have only inadequate wet mechanical properties and suffer a large dissolution loss. Should the ethylene content be over 90 mole percent, the membrane will have inadequate biological compatibilities and poor permeability characteristics. Thus, it is preferable that the copolymer have an ethylene content in the range from 10 to 90 mole percent and, for better results, in the range of from 15 to 60 mole percent. In contrast to polyvinyl alcohols these ethylene-vinyl alcohol copolymers hardly loses any of their constituents by dissolution, and are suitable for use as the membrane for the dialysis of blood. As regards the degree of saponification, to ensure adequate wet mechanical properties, the ethylene-vinyl alcohol copolymer should have a degree of saponification of not less than 80 mole percent, preferably not less than 95 mole percent. Normally, a substantially completely saponified copolymer, i.e. a copolymer having a degree of saponification in excess of 99 mole percent, is employed. The ethylene-vinyl alcohol copolymer may contain copolymerizable comonomers such as methacrylic acid, vinyl chloride, methyl methacrylate, acrylonitrile, vinyl pyrrolidone, etc. in a range not exceeding 15 mole percent.

Also falling within the scope of the present invention are ethylene-vinyl alcohol copolymers obtained by procedures such that either before or after casting or otherwise forming the copolymer into a shaped article, the ethylene-vinyl alcohol copolymer is cross-linked by treatment with, for example, an inorganic cross-linking agent such as a boron compound or an organic cross-linking agent such as a diisocyanate or a dialdehyde, or wherein the functional hydroxyl groups of the vinyl alcohol units have been acetalized within limits not exceeding 30 mole percent by an aldehyde such as formaldehyde, acetaldehyde, butyraldehyde, benzaldehyde or the like. The ethylene-vinyl alcohol copolymer employed according to the present invention preferably has a viscosity of 1.0 to 50 centipoises as determined by a B-type viscosimeter for a dimethylsulfoxide solution concentration of 3 weight percent at 30° C. If the copolymer has a lower viscosity, that is to say a lower degree of polymerization, it does not provide a membrane possessing the necessary mechanical properties. Should the viscosity be higher than the above upper limit, the copolymer cannot be easily cast or otherwise formed.

Solvents suitable for dissolving the present ethylene-vinyl alcohol copolymer are known, for example monohydric alcohols such as methanol, ethanol, etc.; polyhydric alcohols such as ethylene glycol, propylene glycol, glycerin, etc; phenol, m-cresol, methylpyrrolidone, formic acid, etc. and mixtures of them with water. However, in order to obtain a blood-dialysis membrane of the present invention having a satisfactory balance between water-permeability and solute-permeability characteristics, it is preferable to employ dimethylsulfoxide, dimethylacetamide or a mixture of them as the solvent. In particular, dimethylsufloxide in which ethylenevinyl alcohol copolymers are highly soluble is desirable. In dissolving the ethylene-vinyl alcohol copolymer in the aforementioned solvent, particularly dimethylsulfoxide, the solvent may include other solvents such as water, methanol, isopropyl alcohol, dimethylformamide, etc., other liquids which are highly miscible with said particular solvent and/or inorganic salts provided that they have precipitation points (the temperature at which the ethylene-vinyl alcohol copolymer completely dissolved in the solvent starts being precipitated as the solution is gradually cooled) below 60° C.

In dissolving the ethylene-vinyl alcohol copolymer in the aforementioned solvent, the concentration of the copolymer should be within the range of from 5 to 50 weight percent and preferably within the range of from 10 to 35 weight percent. The temperature of the polymer solution should be within the range of from 0 to 120° C, preferably from 5 to 60° C. The polymer may be degraded at temperatures higher than 120° C, while it would be too viscous to be easily shaped into an article at temperatures below 0° C.

The coagulating agent to be employed for said coagulation bath is an aqueous medium. The aqueous medium may be water alone or a mixture of water with not more than 50 weight percent of a water-miscible organic solvent, normally the same solvent as that used in the preparation of the copolymer solution or casting dope, or a system comprising such a medium plus an inorganic salt, such as sodium sulfate, dissolved therein.

To obtain the contemplated membrane having excellent and controlled permeability characteristics according to the present invention, it is particularly important to select suitable coagulation conditions. If the coagulation is accomplished under conditions as mild as practicable, the resultant membrane is transparent in the wet condition, substantially free from large pores exceeding 2 microns in diameter and, instead has micropores substantially uniformly distributed throughout its longitudinal and transverse sectional areas. The term 'mild conditions' as used herein means that the solution coagulates in a time of not less than 3 seconds, preferably 5 seconds or more, as determined by the method hereinafter described. The coagulation time of the solution is determined by casting a solution of ethylene-vinyl alcohol copolymer onto a glass plate to obtain a film having a thickness of 100 microns (as measured in pure water) and measuring the time required for the solution to completely coagulate (by this time the film will be such that if it be stripped off from the glass plate, it will leave no residue of uncoagulated polymer solution on the glass plate). Therefore, in forming the copolymer solution into a shaped article, the solvent, the concentration and temperature of the polymer solution, and the composition and temperature of the coagulation bath should be selected according to the ethylene content and degree of saponification of the ethylene-vinyl alcohol copolymer employed so as to meet the above coagulation time requirement. Since the coagulation time varies with film thickness, the tests are performed under conditions leading to the attainment of a film having a thickness of 100 microns to find a coagulation time satisfying the above time requirement and these conditions are used for the actual production of separation membranes having various thicknesses. The actual production of a membrane does not necessarily require a glass plate or any other support means but, even in such cases, the coagulating conditions selected by the above procedure are employed. The coagulation time thus selected is characteristically much longer than the time heretofore known in association with the prior art wet-casting process where the solvent is a water-alcohol system. With a water-alcohol system, the coagulation time as determined by the above procedure, is somewhere between 1 and 2 seconds and slower coagulation cannot be accomplished even by varying the various other conditions. Of course, even when dimethylsulfoxide is employed as the solvent, unless the above conditions are satisfied, rapid coagulation takes place, and a useful membrane having a satisfactory balance between permeability to water and permeability to solutes is not formed. The factor to be particularly considered in achieving such mild coagulation is the coagulation temperature. When an ethylene-vinyl alcohol copolymer with an ethylene content of 15 to 60 mole percent and a degree of saponification of not less than 95 mole percent (preferably 99 mole percent or higher) is dissolved in a solvent based on dimethylsulfoxide at a polymer concentration of from 10 to 35 weight percent and the resultant solution is extruded or otherwise contacted with a coagulation bath comprising water as a principal component, the preferred coagulation temperature is expressed by the following relations. Assuming that the concentration is the copolymer is C and the coagulation temperature is T° C.

When $$10 \leqq C < 25, 0 \leqq T \leqq C - 10 \quad (1)$$

When $$35 \geqq C \geqq 25, C - 25 \leqq T \leqq C - 8 \quad (2)$$

Thus, under conditions conducive to the above coagulation time, the coagulation temperature just indicated is selected.

According to the contemplated mode of use, the ethylenevinyl alcohol copolymer membrane is formed in the shape of flat sheet, tubing or hollow fiber, with or without the aid of a supporting device. The coagulation may be achieved by means of a plurality of baths, but in such a setup, at least the first of the coagulation series of baths must satisfy the aforementioned requirement.

The structure of the membrane produced as above according to the present invention was examined with a scanning electron microscope. The dry membrane was frozen with liquid nitrogen and broken so that it presents a fracture cross-section. This sectional area was coated with gold to a thickness of 100 Angstrom units and examined under an electron microscope. Using an accelerating voltage of 20 KV, the secondary electron image was observed and photographed.

Figure 3:
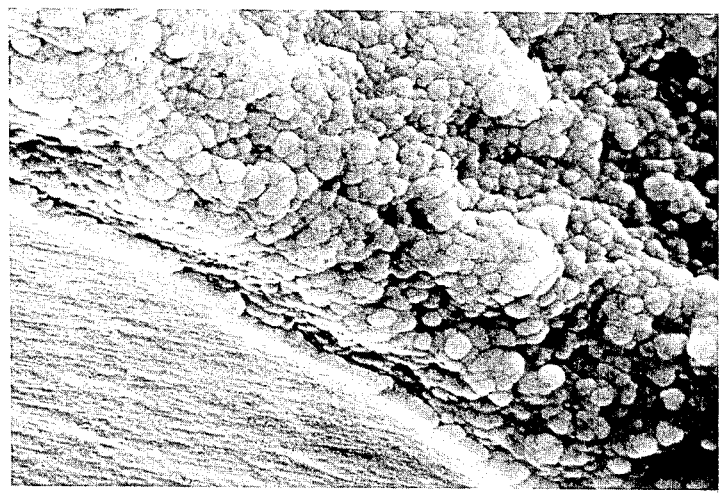
Figure 4:
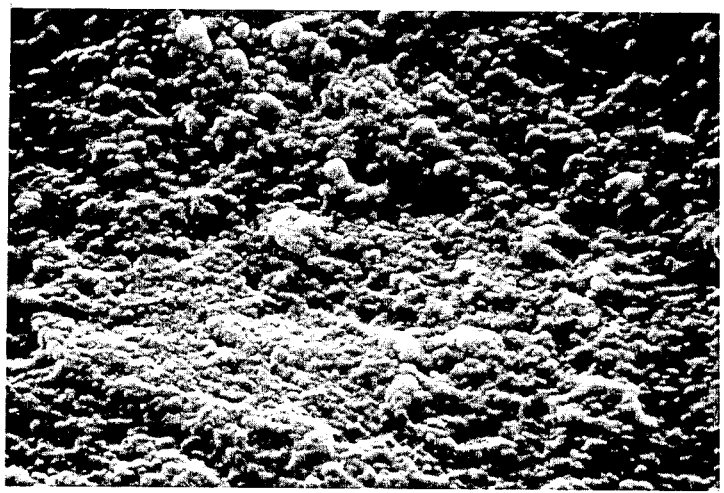
Figure 5:
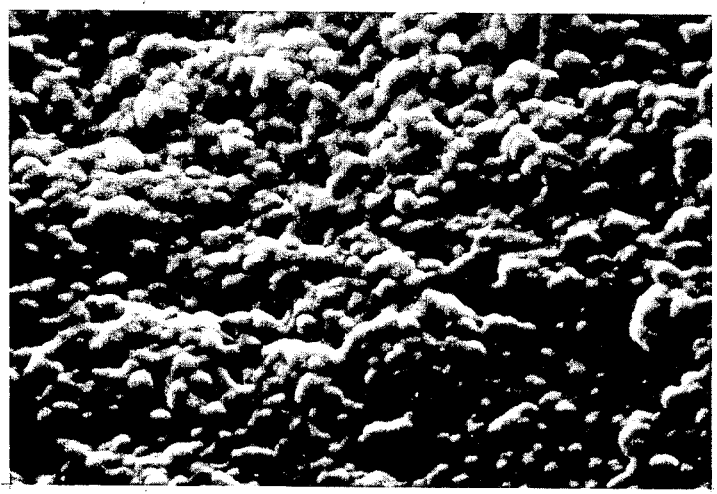

The membrane subjected to the above electronmicroscopic examination was prepared by dissolving a completely saponified ethylene-vinyl alcohol copolymer with an ethylene content of 33 mole percent in dimethylsulfoxide at a concentration of 20 percent and then coagulating the solution in water at 5° C to a thickness of 50 microns. The electronmicrographs of the membrane are shown in FIGS. 1 to 5. The electronmicrographs of FIGS. 1 and 2 were taken at magnifications of 2400 times and 8000 times, respectively, using an electron-microscope (JSM-2; manufactured by Nihon Denshi Kabushiki Kaisha). FIGS. 3 to 5 are the electronmicrographs taken of the same membrane at the magnifications of 12000, 12000 and 24000 times, respectively, using an electron microscope (HFS-2; manufactured by Hitachi Seisakusho, K. K.). It will be seen from FIG. 1 that, at a magnification of 2400 times, the membrane according to the present invention is substantially homogeneous throughout its cross-section, indicating that, at magnifications of this order, at porous structure is not ascertainable.

Figure 2:
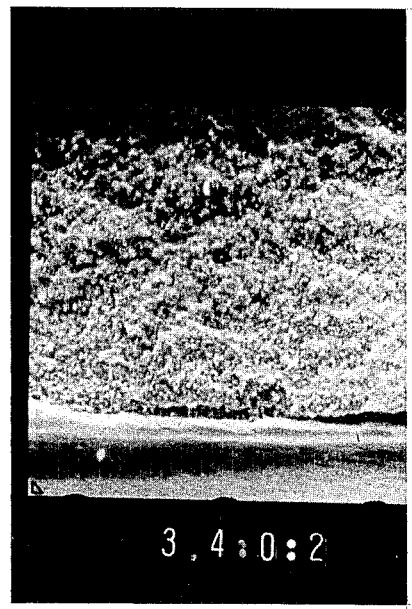

When the membrane of the present invention is examined at higher magnifications it is found, as from FIG. 2, that the membrane consists of small particles bonded together, suggesting that the tiny gaps between the particles are contributing to the excellent permeability of the membrane. This structure is more clearly apparent from FIGS. 3 to 5. FIG. 3 shows the structure near the surface of the membrane; FIG. 4 shows the inner zone of the same membrane; and FIG. 5 is a electronmicrograph of the membrane taken at a greater magnification of the same inner zone.

These electronmicrographs show that the membrane according to the present invention has the following structure. Its constituent particles have an average diameter substantially in the range of 100 to 10,000 Angstrom units, normally within the range of 500 to 5,000 Angstrom units, and are bonded to each other to form a self-supported membraneous structure. The term 'average particle diameter' as used throughout this specification and the claims appended thereto means the average of particle sizes as found by electron micrographic observation throughout the membrane.

As will be seen from these electronmicrographs, any two adjacent particles in many cases do not contact with each other at a point but have a plane of contact in common, thus being bonded to each other to form a membrane while retaining their independent particulate identities. Where the shape of a particle has been distorted by its bonding to the adjoining particle, the particle diameter is calculated assuming the intact shape of the particle that could be visualized if it were not bonded to the adjacent particle but independently present. The membrane according to the present invention shown in the electronmicrographs have an average particle diameter of about 2000 Angstrom units.

Thus, while, as aforesaid, the constituent particles of the present membrane have an average particle diameter in the range of 100 to 10000 Angstrom units, the individual particles also respectively have a diameter substantially within the range of 100 to 10000 Angstrom units. It holds true, roughly speaking, that these particles are distributed substantially evenly in the direction of thickness of the membrane, although there is a tendency such that the superficial layer of the membrane is comprised of comparatively large particles while the inner or core layer of the membrane comprises of relatively small particles. Although some of the individual particles are too small to be discrete enough on electronmicrographs, such particles are not numerous and are disregarded in the computation of an average particle diameter.

Since these particles are bonded together to form a membrane, a multiplicity of tiny gaps are created between the particles. The gaps vary in size and shape but the variations are by far smaller than those of the hitherto-known ethylene-vinyl alcohol copolymer membranes and it is apparently for this reason that the membrane of the present invention displays permeability characteristics distinct from those of the prior art membranes.

Furthermore, the membrane of the present invention is substantially skinless; that is to say, it does not have a dense, thick superficial layer. While, as will be seen from FIG. 3, there is occasionally a very thin skin (on one side only, and a thickness of about 1 percent based on the overall thickness of the membrane), the membrane may be said to be substantially skinless because of the presence of a skin layer of this order of magnitude does not interfere with the permeability of the membrane in any significant measure.

Figure 6:
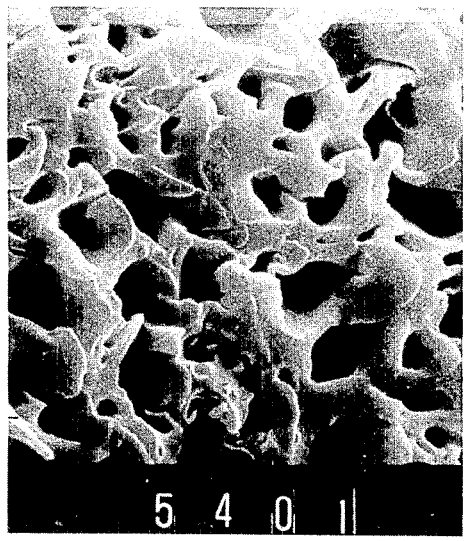
FIGS. 6 and 7 are electronmicrographs showing the cross-sectional views of prior art ethylene-vinyl alcohol copolymer membranes.
Figure 7:

The structural views of the inner layer of the prior art ethylene-vinyl alcohol copolymer are shown in FIGS. 6 and 7. FIGS. 6 and 7 are electronmicrographs taken at the magnifications of 2400 times and 8000 times, respectively, using an electron microscope, JSM-2 of Nihon Denshi Kabushiki Kaisha. This prior-art membrane was prepared by dissolving an ethylene-vinyl alcohol copolymer similar to the above in a solvent mixture (7:3) of methanol and water and forming the resultant solution into a membraneous article. The concentration of said solution, the composition and temperature of the coagulation bath employed are the same as those employed for the production of the present membrane involving the use of dimethylsulfoxide as the solvent. As will be seen rom FIG. 6, the prior-art membrane already reveals a porous structure even at a magnification of 2400 times, having may large pores (diameter, more than 2 microns). This structure is more apparent at a magnification of 8000 times. Thus, comparison of the membrane according to the present invention with the prior art membrane at once shows a marked difference in micro-structure. At least, whereas the prior art membrane contains a large number of pores larger than 2 microns in diameter, the membrane according to the present invention is substantially devoid of pores exceeding the above pore size limit.

The prior art ethylene-vinyl alcohol copolymer membrane is produced by a forming process involving the employment of a solvent mixture of water and an organic solvent such as methanol, isopropyl alcohol or the like, but because of the inadequate solubility of the copolymer in such a solvent mixture, the coagulation time is of necessity short irrespective of what conditions are employed. Thus, it is impossible to effect a slow coagulation such as that feasible in accordance with the present invention. It follows, then, that the prior art membrane contains many pores larger than 2 microns in diameter and, although it is not evident in the electron-micrographs, there is a thickskin on the surface (a dense skin layer as thick as about 3 percent or more based on the overall thickness of the membrane). Therefore, the prior art membrane is inhomogeneous and shows a white turbidity and fails to exhibit the desired permeability characteristics.

Because it is formed by using the aforementioned particular solvent under the conditions defined hereinbefore, the membrane according to the present invention is substantially free from pores larger than 2 microns in diameter. It is a membrane having a substantially homogeneous micro-structure which is transparent in wet condition and displays the characteristics desired in a separation membrane and, particularly, in a membrane for the dialysis of blood. Thus, the membrane according to the present invention has a permeability of water of 10 to 200 $\times$ 10$^{-16}$ cm$^2$, a permeability to vitamin B$_{12}$ of not less than 0.8 $\times$ 10$^{-7}$ cm$^2$ per second and, in addition, has the mechanical strength required of a membrane for he dialysis of blood. Particularly, it is the distinct feature of the membrane according to the present invention that there is a good balance between permeability to water and permeability to vitamin B$_{12}$.

The membrane formed as above is rinsed with water at a low temperature not exceeding 50° C, if required. The membrane may be maintained in wet condition without being dried and, if required, may be sterilized before use. However, the necessity of storing the membrane in water before and after use is a disadvantageous factor in the transportation and assembly membranes into a module and it is, therefore, necessary to have a dry film retaining the properties established as it is formed. For this purpose, the wet membrane just formed is preferably dipped into a water-miscible organic non-solvent to replace the aqueous solvent present on the surface or/and inside of the membrane and, thereafter, the membrane is dried at atmospheric or reduced pressure and at a temperature below the glass transition point of the ethylene-vinyl alcohol copolymer, preferably in the neighborhood of room temperature. By the above procedure, a dry permeable membrane retaining the desired permeability characteristics may be obtained. As the organic solvents preferred for the purpose, there may be mentioned lower aliphatic alcohols or ketones of 1 to 5 carbon atoms, such as methanol, ethanol, amyl alcohol, acetone, methyl ethyl ketone, diethyl ketone and so forth. Acetone is particularly desirable. Drying after the above treatment is accomplished at a temperature below the glass transition point of the copolymer.

A dry membrane retaining the permeability characteristics immediately after forming may also be obtained in manner wherein, instead of replacing the water with such an organic solvent, the membrane freshly formed and in wet condition is treated with a polyhydric aliphatic alcohol of 2 to 4 carbon atoms or an adduct of 1 to 20 moles of ethylene oxide of such a polyhydric alcohol in aqueous, alcoholic or other solution and at a temperature of not more than 50° C and, thereafter, the membrane is dried at a temperature not in excess of 50° C. In such cases, the resultant membrane contains about 20 to 120 percent of the polyhydric alcohol or polyhydric alcoholethylene oxide reactant based on the ethylene-vinyl alcohol copolymer which, however, may subsequently be easily removed by rinsing prior to dialysis after being incorporated into a modular unit. As said polyhydric alcohol of 2 to 4 carbon atoms, there may be mentioned ethylene glycol, diethelene glycol, propylene glycol, 1,3-butanediol, 1,4-butanediol, glycerin and so forth, glycerin being particularly preferred. It is also possible in incorporated such as polyhydric aliphatic alcohol in the wet-coagulation bath so that the membrane will contain said alcohol as the former is formed.

The separation membrane of the present invention is normally put to use as formed into a flat sheet or tube with a thickness in the range of 10 to 100 microns. It may also be formed and used in the shape of a hollow fiber, which may measure about 50 to 1500 microns in outer diameter and about 10 to 300 microns in wall thickness.

While the ethylene-vinyl alcohol copolymer membrane of the present invention has properties which, as mentioned hereinbefore, are particularly beneficial for use as an artificial kidney membrane for the dialysis of blood, it is useful as a filtration and separation medium for bacteria, proteins, viruses and colloidal substances and may also be used for other dialytic or ultrafiltration purposes.

The following examples are intended to further illustrate the present invention without limiting its scope described hereinbefore and set out in the appended claims.

Example 1

An ethylene-vinyl alcohol copolymer having an ehtylene content of 33 mole % and a degree of saponification of not less than 99 mole % was dissolved in dimethylsulfoxide to prepare a solution of 24% concentration at a temperature of 40° C. This solution was formed into a membrane in a coagulation bath comprising water, the membrane being 50 microns thick.

The membrane thus freshly formed and in wet condition was tested for permeability to uric acid, vitamin B$_{12}$ and water. The results are set forth in Table 1. The properties of the cuprophane membrane currently available on the market for artificial kidney use are also shown in Table 1. It will be obvious from these data that the membrane according to the present invention is considerably superior to the conventional membrane for the purposes of blood dialysis.

The permeability behaviors of these membranes against water, uric acid and vitamin B$_{12}$ were determined by the following procedures.

Figure 8:
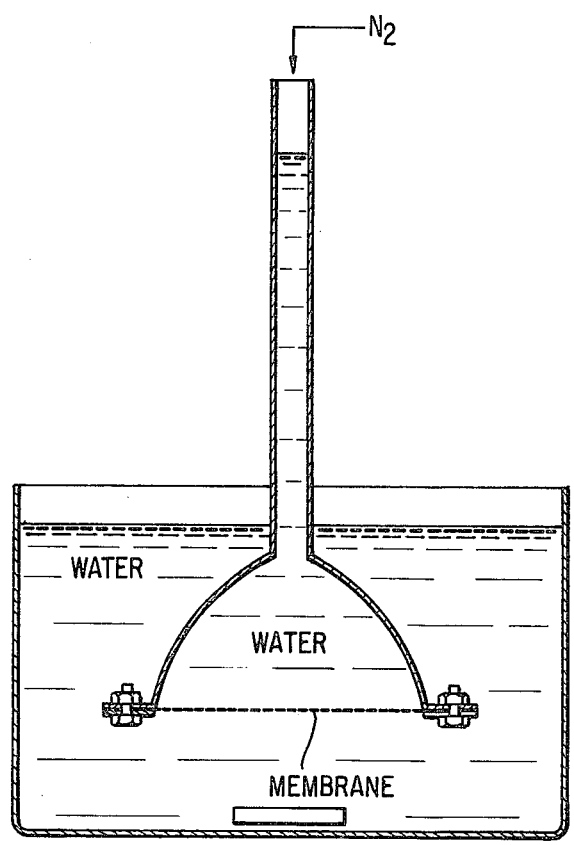
FIG. 8 is a cross-sectional view showing the apparatus used to measuring the permeability to water of membrane samples.

(i) The permeability to water of each membrane was determined by the apparatus illustrated in FIG. 8 at 37° C and 100–300 mm Hg and the permeability coefficient k was calculated by means of equation (3).

$$k = VL\eta/tA\Delta P (cm^2) \quad (3)$$

where
- V: volume of permeated water (cm$^3$)
- L: thickness of the membrane (cm)
- $\eta$: viscosity of water (g/cm · sec.)
- t: permeation time (sec.)
- A: area of the membrane (cm$^2$)
- $\Delta P$: measuring pressure (g/cm · sec.$^2$)

Figure 9:
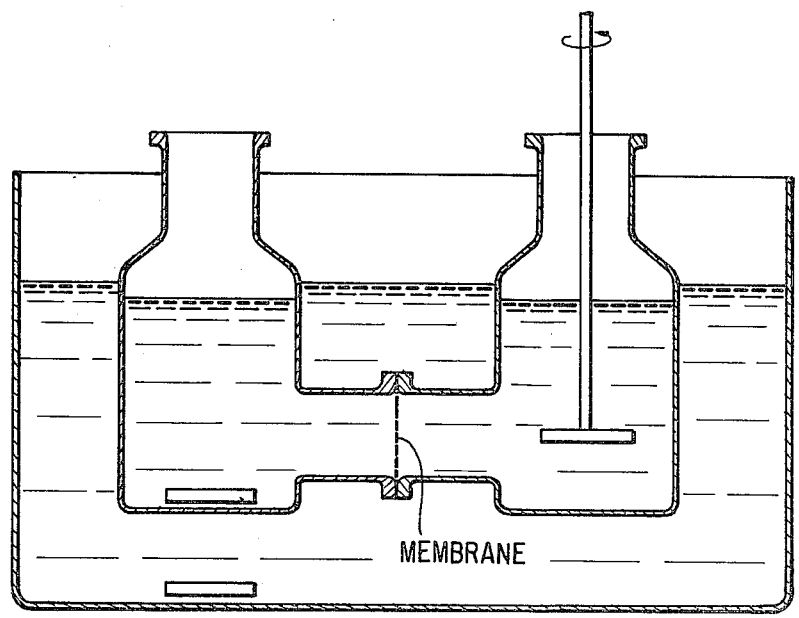
FIG. 9 is a cross-sectional view showing the apparatus used to measuring the permeability to vitamin $B_{12}$ or uric acid of membrane samples

(ii) The permeabilities to solutes such as vitamin $B_{12}$ and uric acid were determined by means of the apparatus illustrated in FIG. 9 at 37° C and the permeability constants D were calculated by means of equation (4). The concentrations were measured by ultraviolet spectrometry.

$$D = \frac{L}{\left(\frac{1}{V_1} + \frac{1}{V_2}\right)At} \ln\left\{\frac{1 - C_2/C_1}{1 + V_2/V_1 \cdot C_2/C_1}\right\} (cm^2/sec.) \quad (4)$$

Where
- L: thickness of the membrane (cm)
- A: area of the membrane (cm$^2$)
- $C_1$: the concentration of the solute in the chamber 1 after t seconds
- $C_2$: the concentration of the solute in the chamber 2 after t seconds
- $V_1$: volume of the chamber 1
- $V_2$: volume of the chamber 2

(At t = 0,1: the solute side, 2: the pure water side)

Table 1

| Sample | Uric acid (cm$^2$/sec × 10$^7$) | Vitamin B$_{12}$ (cm$^2$/sec × 10$^8$) | Water (cm$^2$ × 10$^{16}$) |
|---|---|---|---|
| Ethylene-vinyl alcohol copolymer membrane | 11.6 | 35.1 | 110 |
| Cuprophane membrane | 5.9 | 8.4 | 7.5 |

Then, the ethylene-vinyl alcohol copolymer membrane was subjected to an elution test. The results are shown in Table 2, together with the corresponding data on the cuprophane membrane. The above elution test was performed in the following manner. The sample membrane was cut to 1.5 cm square, and 2 grams of the specimens were heated together with 100 ml of distilled water at 70° C for predetermined time periods. Ten ml. of the extract was taken, and following the addition of 20 ml of a 0.01 N-aqueous solution of potassium permanganate and 1 ml of a 3N-aqueous solution of sulfuric acid, the extract was boiled for 3 minutes and, then, allowed to cool. Then, 1 ml of an aqueous solution of potassium iodide (10 wt. %) was added, whereupon iodine was liberated to turn the solution from violet to reddish yellow. This liberated iodine was titrated with sodium thiosulfate and the difference from the blank was taken as the amount of potassium permanganate consumed. One ml of an aqueous solution of starch (1%) was added as an indicator. Of course, a fresh extract was used for each of the elution runs.

Table 2

| Sample | Consumption of KMnO$_4$, ml | | |
|---|---|---|---|
| | 1st elution (1 hr.) | 2nd elution (2 hrs.) | 3rd elution (2 hrs.) |
| Ethylene-vinyl alcohol copolymer membrane | 1.12 | 0.32 | 0.11 |
| Cuprophan membrane | 15.80 | 0.87 | 0.31 |

It will be seen from Table 2 that, compared with the cuprophane widely employed presently as a dialysis membrane for artificial kidney use, the ethylene-vinyl alcohol copolymer membrane of the present invention yields only reduced amounts of extracted substances.

The in vitro blood compatibility of the ethylene-vinyl alcohol copolymer membrane was evaluated in the following manner. In the first place, an antihaemolysis test was performed as follows. The sample membrane was cut into a square 2 cm × 2 cm, which was then laid on the bottom of a glass test tube of 18 mm diameter. Into the test tube was placed 3 ml of a 10% suspension of red blood cells and the tube was left standing at 37° C for 49 hours. Thereafter, the suspension was centrifuged and 0.2 ml of the supernatant was taken and diluted to 10 ml. Then, the absorbance at 413 nm was measured to determine the amount of haemoglobin (relative amount) produced by haemolysis. The result was 0.66 for the present membrane, in contrast to 0.76 for the control cuprophane.

The anti-coagulation test was performed by a procedure similar to the kinetic method of Imai-Nosé. Thus, the ACD blood of a dog was put on a wet specimen in a dish and an aqueous solution of CaCl$_2$ was added to the suspension to initiate the coagulation reaction at 37° C. After 5 minutes and 30 seconds, the clot of blood accounted for 40 weight % (with the weight of the glass as 100), in contrast to the corresponding value of 42% for the control cuprophane. It is thus clear that the blood compatibility of the ethylene-vinyl alcohol copolymer membrane according to the present invention is relatively superior to that of the conventional membrane.

EXAMPLE 2

Ethylene-vinyl alcohol copolymers with an ethylene content of 33 mole % and that of 45 mole %, respectively, both having a degree of saponification of not less than 99%, were each dissolved in methanol-water, n-propanol-water or dimethylsulfoxide, and each solution was formed into membranes under various conditions. These membranes were tested for permeability characteristics. The results are set forth in Table 3.

Table 3

| No. | Ethylene content (mole %) | Solvent (vol.ratio) | Concentration of solution (%) | Coagulation temperature (° C) | Coagulation time as defined in this specification (sec) | Permeabilities Water (cm$^2$ × 10$^{16}$) | Vitamin B$_{12}$ (cm$^2$/sec × 10$^7$) | Appearance of wet membrane |
|---|---|---|---|---|---|---|---|---|
| 3-1 | 33 | n-Propanol/water(50/50) | 20 | 3 | 2.5 | 394 | 0.6 | White turbidity, opaque |

Table 3-continued

| No. | Ethylene content (mole %) | Solvent (vol.ratio) | Concentration of solution (%) | Coagulation temperature (° C) | Coagulation time as defined in this specification (sec) | Permeabilities Water (cm² × 10¹⁶) | Permeabilities Vitamin B₁₂ (cm²/sec × 10⁷) | Appearance of wet membrane |
|---|---|---|---|---|---|---|---|---|
| 3-2 | " | "(60/40) | 20 | 3 | 2.5 | 451 | 0.8 | " |
| 3-3 | 45 | " | 25 | 3 | 2.5 | 102 | 0.7 | " |
| 3-4 | " | " | 25 | 3 | 2 | 74 | 0.4 | " |
| 3-5 | 33 | Methanol/water(70/30) | 23 | 3 | 2 | 9 | 0 | " |
| 3-6 | " | Dimethyl-sulfoxide | " | 3 | 5 | 160 | 3.5 | Transparent |
| 3-7 | 45 | " | " | 3 | 4 | 150 | 2.0 | " |
| 3-8 | 33 | " | 20 | 20 | 2 | 286 | 3.0 | Opaque |
| 3-9 | " | " | 23 | 5 | 7 | 140 | 3.2 | Transparent |
| 3-10 | " | " | 20 | 5 | 8 | 150 | 3.3 | " |

(Note) 3-1 to 3-8: Temperature of polymer solution 60° C, 3-9 to 3-10 40° C: coagulation bath: water; the thickness of membranes: 50 microns.

It will be apparent from the above results that when membranes are formed under conditions such that the coagulation is completed in times less than the limit of 3 seconds as defined in this specification, the resultant membranes do not satisfy the permeability requirements for membranes for the dialysis of blood. In contrast, when formed under conditions corresponding to a time of not less than 3 seconds, the membranes have high permeabilities to water of the membranes tend to be too high.

EXAMPLE 4

The membrane of No. 33-2 of Example 3 was further after-treated to evaluate the possible degradation of the membrane characteristics. The results are shown in Table 5.

Table 5

| Sample No. | Conditions of after-treatment | Permeabilities Uric acid (cm²/sec × 10⁷) | Permeabilities Vitamin B₁₂ (cm²/sec × 10⁸) | Permeabilities Water (cm² × 10¹⁶) |
|---|---|---|---|---|
| 33-2 | Membrane just formed and wet | 10.5 | 35 | 146 |
| 33-2-a | Acetone replacement, followed by drying at room temp. | 9.5 | 35 | 146 |
| 33-2-b | Dipped in 20% aqueous glycerin, followed by drying at room temp. | 10.0 | 35 | 144 | permeability to water and to vitamin $B_{12}$.

It is also obvious from Table 3 that the use of a solvent mixture of alcohol and water does not provide a membrane with a good balance between permeability to water and permeability to vitamin $B_{12}$.

EXAMPLE 3

Ethylene-vinyl alcohol copolymers (degree of saponification: 99 mole % or more) with an ethylene content of 33 mole % and that of 45 mole %, respectively, were each dissolved in dimethylsulfoxide and the resultant solutions were respectively extruded through dies into a coagulation bath (water) to prepare membranes. The relation of coagulating conditions to permeability characteristics is shown in Table 4.

It will be seen from Table 5 that either acetone replacement followed by drying at room temperature or glycerin treatment followed by drying at room temperature results in no degradation of permeability performance, thus invariably giving rise to dry membranes retaining the excellent permeability characteristics. This result is additional evidence of the usefulness of the ethylene-vinyl alcohol copolymer membrane according to the present invention for blood dialysis purposes.

We claim as our invention:

1. A separation membrane formed from an ethylene-vinyl alcohol copolymer wherein said membrane has a micropore structure which is substantially uniform throughout its longitudinal and transverse sectional areas and wherein its constituent particles have an average Table 4

| No.* | Coagulating conditions Concentration of solution (wt. %) | Coagulating conditions Temperature of solution (° C) | Coagulating conditions Coagulation temperature (° C) | Permeabilities Uric acid (cm²/sec. × 10⁷) | Permeabilities Vitamin B₁₂ (cm²/sec. × 10⁸) | Permeabilities Water (cm² × 10¹⁶) |
|---|---|---|---|---|---|---|
| 33-1 | 20 | 20 | 4 | 11.5 | 35 | 93 |
| -2 | 20 | 20 | 6.5 | 10.5 | 35 | 146 |
| -3 | 20 | 20 | 20 | 20.0 | 53 | 1460 |
| -4 | 20 | 60 | 4 | 14.0 | 47 | 140 |
| 45-1 | 17 | 30 | 6 | 9.2 | 34 | 97 |
| -2 | 17 | 40 | 10 | 11.6 | 42 | 300 |
| -3 | 23 | 80 | 13 | 9.5 | 38 | 179 |
| -4 | 20 | 30 | 12.5 | 12.3 | 45 | 327 |

*"33" and "45" stand for the ethylene contents of the ethylene-vinyl alcohol copolymers employed.

It will be seen from Table 4 that where the coagulation temperatures are high as in 33-3, 45-2 and 45-4, the diameter in the range of 100 to 10000 Angstrom units as electron-microscopically determined for a dry membrane and are bonded to each other to form a membrane that is substantially free from pores in excess of 2 microns in diameter.

2. The separation membrane of claim 1 wherein said membrane is made of an ethylene-vinyl alcohol copolymer with an ethylene content of 10 to 90 mole percent and a degree of saponification of not less than 80 mole percent.

3. The separation membrane of claim 1 wherein said membrane is made of an ethylene-vinyl alcohol copolymer with an ethylene content of 15 to 60 mole percent and a degree of saponification of not less than 95 mole percent.

4. The separation membrane of claim 1, which is produced by wet coagulation of an ethylene-vinyl alcohol copolymer.

5. A separation membrane with excellent blood dialyzing characteristics as formed from an ethylene-vinyl alcohol copolymer, wherein said membrane has a micropore structure which is substantially uniform throughout its longitudinal and transverse sectional areas and wherein its constituent particles have an average diameter in the range of 100 to 10000 Angstrom units as electron-microscopically determined for a dry membrane and are bonded to each other to form a membrane, that it is substantially free from pores in excess of 2 microns in diameter and that said membrane has a permeability to water of 10 to 200 $\times$ $10^{-16}$ cm$^2$ and a permeability to vitamin B$_{12}$ of not less than 0.8 $\times$ $10^{-7}$ cm$^2$ per second.

6. A method for producing a separation membrane characterized in that said method comprises dissolving an ethylene-vinyl alcohol copolymer with an ethylene content of 15 to 60 mole percent and a degree of saponification of not less than 95 mole percent in a solvent selected from the group consisting of dimethylacetamide, methylpyrrolidone and dimethylsulfoxide to a polymer concentration (C) in the range of 10 to 35 percent by weight and introducing the resulting solution into a coagulation bath to coagulate said solution into a shaped article wherein said coagulation bath consists essentially of water and from 0 to 50% of a solvent selected from the group consisting of dimethylacetamide, methylpyrrolidone and dimethylsulfoxide at a coagualtion bath temperature (T° C) within the range defined by the following relation:

When $$10 \leq C \leq 25, 0 \leq T \leq C-10 \quad (1)$$

When $$35 \geq C \geq 25, C-25 \leq T \leq C-8 \quad (2)$$

7. The separation membrane prepared by the process of claim 6.

8. A method for producing a separation membrane characterized in that said method comprises dissolving an ethylene-vinyl alcohol copolymer with an ethylene content of 15 to 60 mole percent and a degree of saponification of not less than 95 mole percent in a solvent consisting essentially of dimethylsulfoxide to a polymer concentration (C) in the range of 10 to 35 weight percent, introducing the resulting solution into a coagulation bath to coagulate into said solution and form a shaped article wherein said coagulation bath consists essentially of water at a coagulation bath temperature (T° C) in the range defined by the following relation:
When $$10 \leq C < 25, 0 \leq T \leq C-10 \quad (1)$$

When $$35 \geq C \geq 25, C-25 \leq T \leq C-8 \quad (2)$$

and holding the resultant membrane in substantially wet condition without drying it.

9. A method for producing a separation membrane characterized in that said method comprises dissolving an ethylene-vinyl alcohol copolymer with an ethylene content of 15 to 60 mole percent and a degree of saponification of not less than 95 mole percent in a solvent consisting essentially of dimethylsulfoxide to a polymer concentration (C) in the range of 10 to 35 weight percent, introducing the resulting solution into a coagulation bath to coagulate into said solution and form a shaped article wherein said coagulation bath consists essentially of water at a coagulation bath temperature (T° C) in the range defined by the following relation:

When $$10 \leq C < 25, 0 \leq T \leq C-10 \quad (1)$$

When $$35 \geq C \geq 25, C-25 \leq T \leq C-8 \quad (2)$$

and replacing the water inside and on the membrane so formed with an organic solvent which is miscible with water and in which said copolymer is not soluble, followed by drying at a temperature below the glass transition point of said copolymer.

10. The method of claim 9 wherein said organic solvent is selected from the group consisting of lower aliphatic alcohols and ketones having 1 to 5 carbon atoms each.

11. The method of claim 10 wherein said polyhydric aliphatic alcohol is selected from the group consisting of polyhydric aliphatic alcohols of 2 to 4 carbon atoms and products of reacting 1 to 20 moles of ethylene oxide with any of said polyhydric aliphatic alcohols.

12. The method of claim 10 wherein said organic solvent is acetone.

13. The method of claim 10 wherein said polyhydric aliphatic alcohol is glycerin.

14. A method for producing a separation membrane characterized in that said method comprises dissolving an ethylene-vinyl alcohol copolymer with an ethylene content of 15 to 60 mole percent and a degree of saponification of not less than 95 mole percent in a solvent consisting essentially of dimethylsulfoxide to a polymer concentration (C) in the range of 10 to 35 weight percent, introducing the resulting solution into a coagulation bath to coagulate into said solution and form a shaped article wherein said coagulation bath consists essentially of water at a coagulation bath temperature (T° C) in the range defined by the following relation:
When $$10 \leq C < 25, 0 \leq T \leq C-10 \quad (1)$$

When $$35 \geq C \geq 25, C-25 \leq T \leq C-8 \quad (2)$$

and treating the membrane after forming with a polyhydric alcohol, followed by drying at a temperature not exceeding 50° C.

* * * * *